US012607530B1

(12) United States Patent
Ellis et al.

(10) Patent No.: US 12,607,530 B1
(45) Date of Patent: Apr. 21, 2026

(54) FISHING REEL DRAG SET APPARATUS, SYSTEM, AND METHOD

(71) Applicants: Scott Ellis, Canyon Lake, CA (US);
James E. Grimes, Yorba Linda, CA
(US); Sun Guaynue, Shanghai (CN)

(72) Inventors: Scott Ellis, Canyon Lake, CA (US);
James E. Grimes, Yorba Linda, CA
(US); Sun Guaynue, Shanghai (CN)

(73) Assignee: Scott Ellis, Canyon Lake, CA (US)

( * ) Notice: Subject to any disclaimer, the term of this
patent is extended or adjusted under 35
U.S.C. 154(b) by 0 days.

(21) Appl. No.: 19/357,048

(22) Filed: Oct. 13, 2025

(51) Int. Cl.
| | |
|---|---|
| *G01L 5/00* | (2006.01) |
| *A01K 89/02* | (2006.01) |
| *A01K 97/12* | (2006.01) |
| *G01L 1/22* | (2006.01) |
| *G01L 5/10* | (2020.01) |
| *G06F 3/147* | (2006.01) |
| *G06N 20/00* | (2019.01) |
| *G06F 3/0482* | (2013.01) |
| *G06F 3/0488* | (2022.01) |

(52) U.S. Cl.
CPC ............... *G01L 5/10* (2013.01); *A01K 89/02*
(2013.01); *A01K 97/125* (2013.01); *G01L*
*1/225* (2013.01); *G06F 3/147* (2013.01);
*G06N 20/00* (2019.01); *G06F 3/0482*
(2013.01); *G06F 3/0488* (2013.01)

(58) Field of Classification Search
CPC ........ A01K 89/02; A01K 97/125; G01L 5/10;
G01L 1/225; G06F 3/147; G06F 3/0482;
G06F 3/0488; G06N 20/00
See application file for complete search history.

(56) References Cited

U.S. PATENT DOCUMENTS

| | | | | |
|---|---|---|---|---|
| 4,693,125 | A * | 9/1987 | Krutz ..................... | A01K 87/00 |
| | | | | 43/17 |
| 5,248,113 | A * | 9/1993 | Daniels ................ | A01K 97/125 |
| | | | | 242/246 |
| 5,639,038 | A * | 6/1997 | Hirose ..................... | G01L 5/04 |
| | | | | 242/223 |
| 6,367,339 | B1 * | 4/2002 | Lilonsky ............... | A01K 89/02 |
| | | | | 73/862.393 |
| 11,528,897 | B1 * | 12/2022 | McFadyen ............... | G01L 5/10 |
| 11,905,139 | B2 | 2/2024 | Ellis | |
| 2010/0000143 | A1 * | 1/2010 | Pekin .................. | A01K 97/125 |
| | | | | 242/316 |
| 2011/0138675 | A1 | 6/2011 | Cutts | |

(Continued)

FOREIGN PATENT DOCUMENTS

CN        114097728   A  *  3/2022  ............. A01K 89/00

*Primary Examiner* — Emmanuel M Marcelo
(74) *Attorney, Agent, or Firm* — Charles L. Thoeming

(57) ABSTRACT

A hand-held fishing reel drag set device includes a strain
gauge configured to convert applied strain to a voltage
output, a microprocessor configured to receive strain gauge
voltage output and convert it to a calibrated digital value, a
display configured to present real-time visual feedback of
the calibrated digital value to the user based on the measured
strain, a menu-driven user interface enabling user selection
of operational parameters, a self-contained power source
enabling portable operation, and a real-time, color-coded
feedback system visually indicating whether the applied
strain is below, within, or above a preset threshold to aid a
fisherman in achieving a desired drag setting before attempt-
ing to catch a fish.

14 Claims, 14 Drawing Sheets

(56) References Cited

U.S. PATENT DOCUMENTS

| | | | |
|---|---|---|---|
| 2011/0162465 A1* | 7/2011 | Pekin | A01K 97/14 |
| | | | 73/862.474 |
| 2011/0213570 A1* | 9/2011 | Rayor | A01K 87/007 |
| | | | 702/42 |
| 2012/0085017 A1* | 4/2012 | Pekin | A01K 89/00 |
| | | | 43/25 |
| 2019/0038675 A1 | 2/2019 | Du Plooy | |
| 2022/0234861 A1* | 7/2022 | Ellis | G01L 5/047 |

* cited by examiner

314

312

160

100

172

128

130

132

156

152

150

154

310

To fishing reel to test the drag
allowed based on line weight

Drag Set Go

Pull Test

Ready to
start the test

Press to continue

FISHING REEL DRAG SET APPARATUS, SYSTEM, AND METHOD

FIELD OF THE INVENTION

The present invention relates to the field of fishing drag scales. More specifically, the present invention relates to a fishing reel drag set apparatus, system, and method to aid an angler in using an optimal drag setting when trying to catch a fish.

BACKGROUND

Once a fish is hooked onto the end of a fishing rod, it is important to allow a precise amount of drag in the line. If the drag in the line is too light, the fish may shake the hook or pull the line off the reel. If the drag in the line is too heavy, the fish may break the line or pull the hook. Even experienced anglers have no way of determining the exact force at which the fish is pulling on the line, except via intuition that can be obtained only by experience. The size of the fish often determines the amount of drag an angler would want to apply, but an angler rarely knows the size of the fish until after it is in the boat. Without experience there is no way of knowing the desired amount of tension that should be set in the fishing line.

As noted above, there is a long-felt need in the art for an improved fishing device for setting drag in a fishing line. There also exists a long-felt need in the art for a drag set device that allows the user to set fishing lines to a desired amount of tension. Finally, there exists a need for a device that alerts the user when the desired tension in the line is reached, or if there is not enough or too much tension in the fishing line.

To address this long-felt need in the art for a fishing reel drag set, an apparatus, system, and method are disclosed that provide: 1) a device using a strain gauge configured to convert applied strain to a voltage output, 2) a microprocessor configured to receive strain gauge voltage output and convert it to a calibrated digital value, 3) a display configured to present real-time visual feedback of the calibrated digital value to the user based on the measured strain, 4) a menu-driven user interface enabling user selection of system and method operational parameters, 5) a self-contained power source enabling portable operation of the device assembly and system, and 6) a color-coded feedback device system visually indicating whether the applied strain is below, within, or above a preset threshold. These components are provided in a hand-held body, having upper and lower housings, and containing the microprocessor and interface control elements, input buttons and display screens disposed on body housing surfaces, functional eyelets on body ends, and a rechargeable power supply. The disclosed device is adjustable allotting the user multiple, microprocessor controlled tension settings for the fishing line. Other visual output elements such as colored LEDs, and visual indicators can be part of the microprocessor control element outputs for various embodiments and are included to identify if the drag in the fishing line is too heavy or too light. In this manner, the device can be easily and quickly applied to any fishing rod and fishing line to quickly obtain an ideal drag setting when trying to catch a fish.

For the disclosed and claimed fishing reel drag set apparatus, system, and method herein, one embodiment provides a fishing reel drag set device. The fishing reel drag set device is a precision handheld device designed to electronically measure the strain on a fishing line and convert it into a real-time drag force reading. This enables anglers to calibrate the clutch drag system of their reels with accuracy, ensuring the force exerted during a fish run does not exceed the rated pound-test of the line in use. Setting the drag correctly is essential. If the drag is too tight, sudden force spikes from a fish's movement can snap the line. When set properly, drag provides a consistent counterforce. As the fish exerts energy trying to escape, the controlled resistance causes fatigue, leading to a successful and sporting catch. The device includes a body, an upper housing, an LCD touchscreen, a microprocessor and interface control element, a lower housing, a first eyelet, a second eyelet and an internal rechargeable battery. The first end of the body has an eyelet with a continuous opening and a movable, shafted hook, which is attached to an internal strain gauge within the body that measures the tension in the fish line. This fish line tension is read by the microprocessor and displayed by the LCD touchscreen or can be set to a specific tension. On certain embodiments, the microprocessor control element for embodiments of the drag set device is connected to and communicates with a plurality of LED lights, a plurality of control buttons, and the LCD touchscreen for user input and informational output. The plurality of LED lights illuminate the translucent body in differing colors to visually alert the user of various tension ranges observed in the fishing line.

In this manner, the disclosed fishing reel drag set apparatus, system, and method of the present invention meets all the forgoing goals and provides a precise way to set an appropriate drag in a fishing line. Also, the device alerts the user by multiple output options if the tension in the fishing line is too great. The fishing reel drag set apparatus, system, and method prevents a break in the line from occurring, which would allow the fish to escape.

SUMMARY

The following presents a simplified summary to provide a basic understanding of some aspects of the disclosed fishing reel drag set apparatus, system, and method. This summary is not an extensive overview, and it is not intended to identify key/critical elements or to delineate the scope thereof. Its sole purpose is to present some general concepts in a simplified form as a prelude to the more detailed description presented later.

The fishing reel drag set apparatus, system, and method provides a hand-held tool that measures strain or tension in fishing lines and gives instant feedback to users. It helps anglers adjust their reel's drag tension easily and accurately according to the fishing line's strength and the type of fish they are trying to catch. This tool removes the need for guessing or doing calculations manually, making it easier for users to set the drag tension exactly right.

The subject matter disclosed and claimed herein, in one embodiment thereof, comprises a fishing reel drag set device. The device includes a sophisticated, compact electronic apparatus and system designed to translate applied mechanical strain into a processed digital output, enabling precise and intuitive user interaction. The fishing reel drag set apparatus, system, and method further include a body having upper and lower portions, a microprocessor control element, a plurality of external control buttons, a liquid crystal display (LCD) screen, a first eyelet, a second eyelet, and an internal, rechargeable battery. The first end of the body has a first eyelet including a continuous opening and a shafted hook. The shafted hook includes an integrated rod which can move axially in relation to the shaft and is attached to an internal assembly within the body that measures the tension in the fish line or can be set to a specific tension to set the fishing line at a specific tension. The second eyelet is attached to the second end of the body and provides a continuous opening that allows the device to attach to a plurality of items namely, without limitation, a keychain, fishing vest, tackle box, backpack, or other fishing-related items.

The fishing reel drag set apparatus, system, and method internal assembly within the body include a strain gauge equipped with a Wheatstone bridge circuit. When mechanical force (strain) is applied to an integrated rod, the strain gauge detects the force and generates a corresponding voltage signal. This voltage signal is fed into a microprocessor, which converts it into a calibrated digital value representing force displayed as either kilograms or pounds on the LCD touchscreen.

Elements such as the plurality of light emitting diode (LED) lights, operational buttons, and the LCD touchscreen are accessible for user input and information and may be on any surface of the body of embodiments of the fishing reel drag set apparatus, system, and method. The fishing reel drag set apparatus, system, and method preferably have a plurality of LED lights of differing colors that illuminate a translucent housing to visually alert the user of different amounts of tension present in the fishing line and system status. One or more buttons are also present and can be used to adjust the tension setting of the device. The LCD touchscreen displays programmed tension setting of the device and the current tension of the device in real-time and 180 degree rotatable display selectable by user input mode allowing the LCD touchscreen readout to remain vertically oriented for user ease of readability. Alternate embodiments of the fishing reel assembly, system, and method provide capability for users to weigh fish by hooking through the gills wherein the LCD touchscreen includes a weighing mode function and display in addition to drag setting function and display.

Accordingly, the improved fishing reel assembly, system, and method are advantageous as these features do not interfere with common fishing practices, such as reeling and casting. Further, the device can universally attach to any fishing rod in a way that does not damage the rod. The device can also set the desired amount of tension in the line. So, the device eliminates the need for the user to guess how much drag should be applied and instead allows the user to be confident in applying a desired amount of tension.

The fishing reel drag set apparatus, system, and method may include an artificial intelligence (AI) module to provide an intuitive, automated experience with minimal user training. Unlike traditional force measurement tools, this AI module automatically calibrates itself to varying loads and user settings. The AI module software enhancements may enable predictive strain gauge analysis, helping users anticipate mechanical failures. The AI module software enhancements can be tailored for applications like tension monitoring in fishing lines, load-bearing assessments in industrial settings, and sports equipment testing. The AI module reduces both the amount of microprocessor memory storage space required and electrical power consumed while maintaining acceptable level of performance on each task. Unlike single-purpose strain gauges, the fishing reel drag set apparatus, system, and method provides user and/or system adaptability in measurement ranges and real-time data processing.

To achieve the foregoing and related ends, certain illustrative parts of the fishing reel drag set apparatus, system, and method are described herein in connection with the following description and the annexed drawings. These parts are indicative, however, of but a few of the ways in which the principles disclosed can be employed and are intended to include all such parts and their equivalents. Other advantages and novel features will become apparent from the following detailed disclosure when considered with the drawings.

BRIEF DESCRIPTION OF THE DRAWINGS

The disclosure for the fishing reel drag set apparatus, system, and method refers to drawings provided in which similar reference characters refer to similar parts throughout the different views.

DETAILED DISCLOSURE

Figures 1, 2:
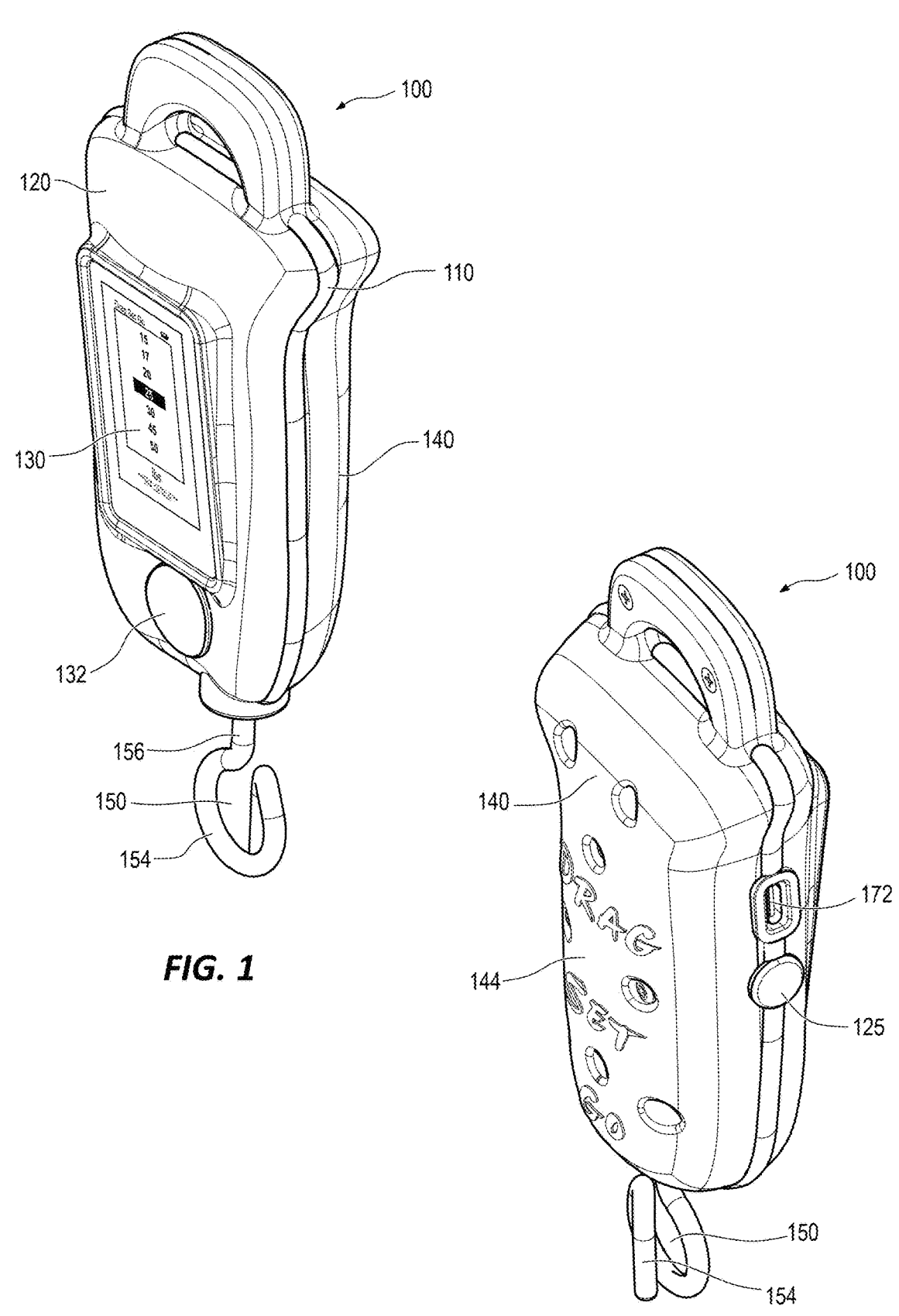
FIG. 1 illustrates a top right front perspective view of an embodiment of the fishing reel drag set apparatus, system, and method 100.
FIG. 2 illustrates a top left rear perspective view of the embodiment of the fishing reel drag set apparatus, system, and method 100 of FIG. 1.
Figure 3:
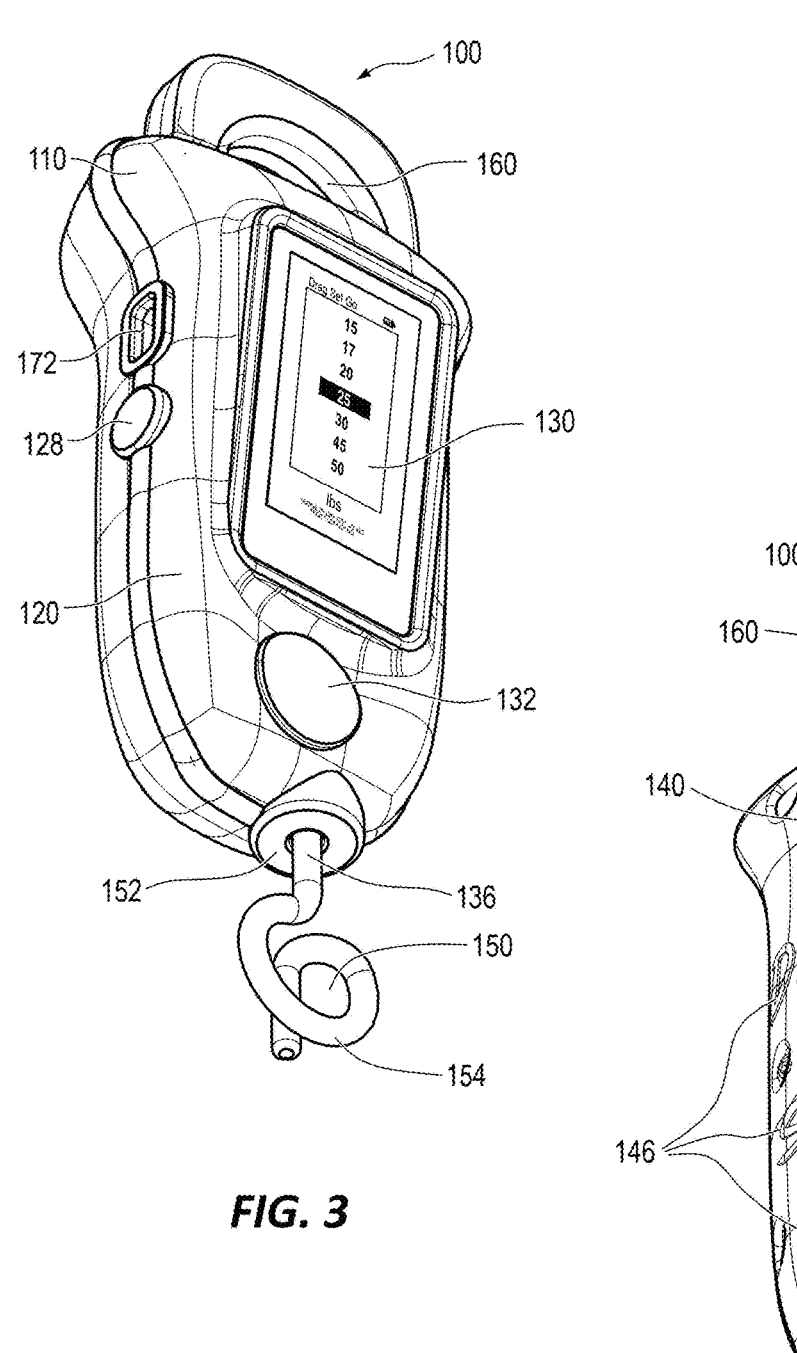
FIG. 3 illustrates a bottom left front perspective view of the embodiment of the fishing reel drag set apparatus, system, and method 100 of FIG. 1.
Figure 4:
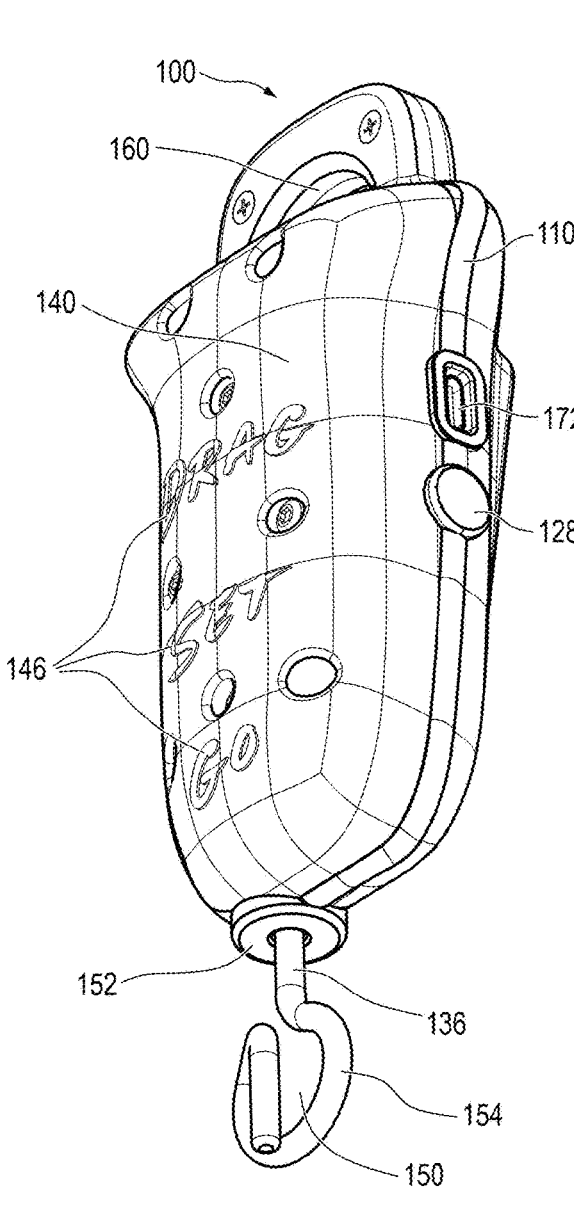
FIG. 4 illustrates a bottom left rear perspective view of the embodiment of the fishing reel drag set apparatus, system, and method 100 of FIG. 1.
Figure 5:
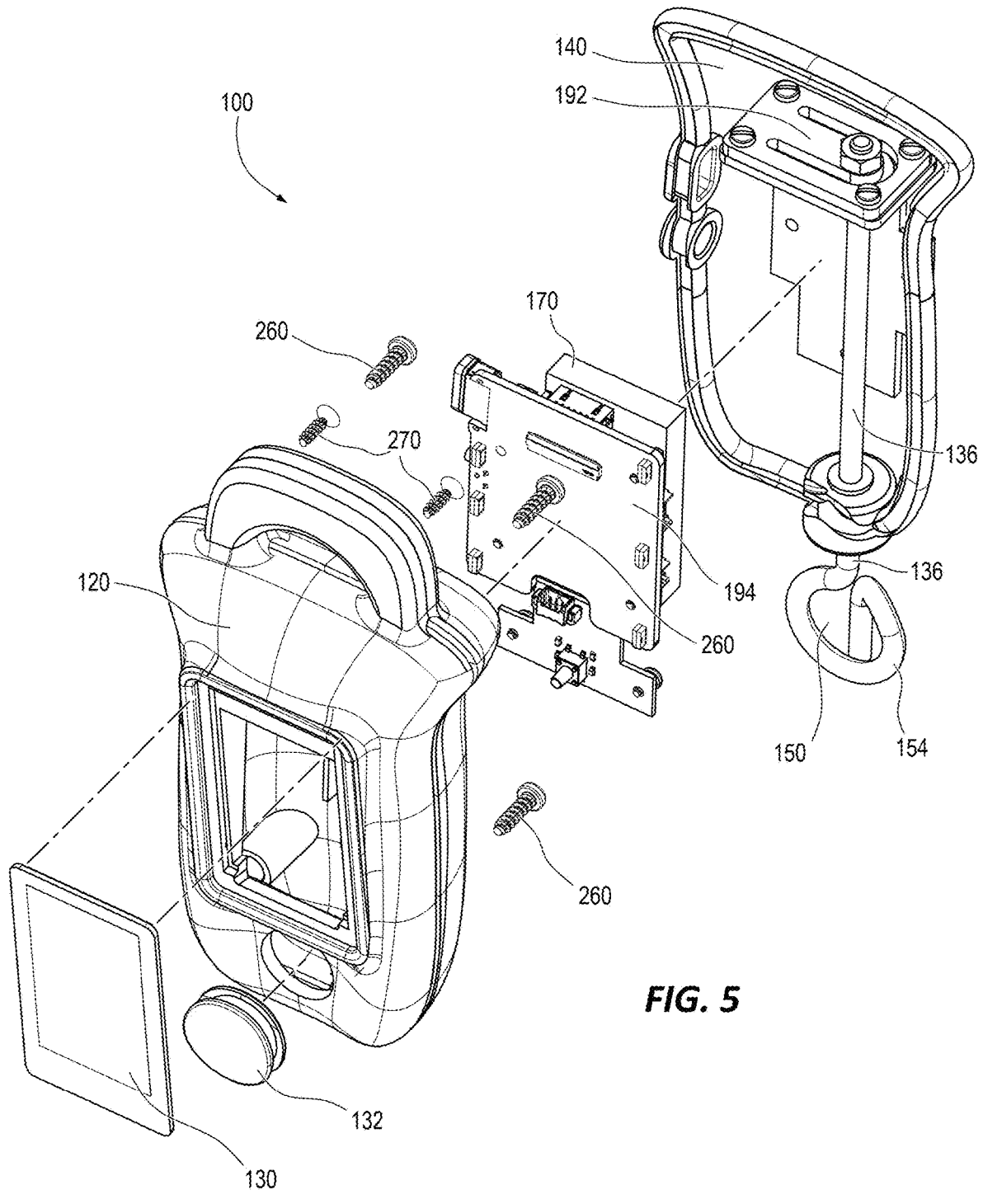
FIG. 5 illustrates a top right front exploded perspective view of the embodiment of the fishing reel drag set apparatus, system, and method 100 of FIG. 1.
Figure 6:
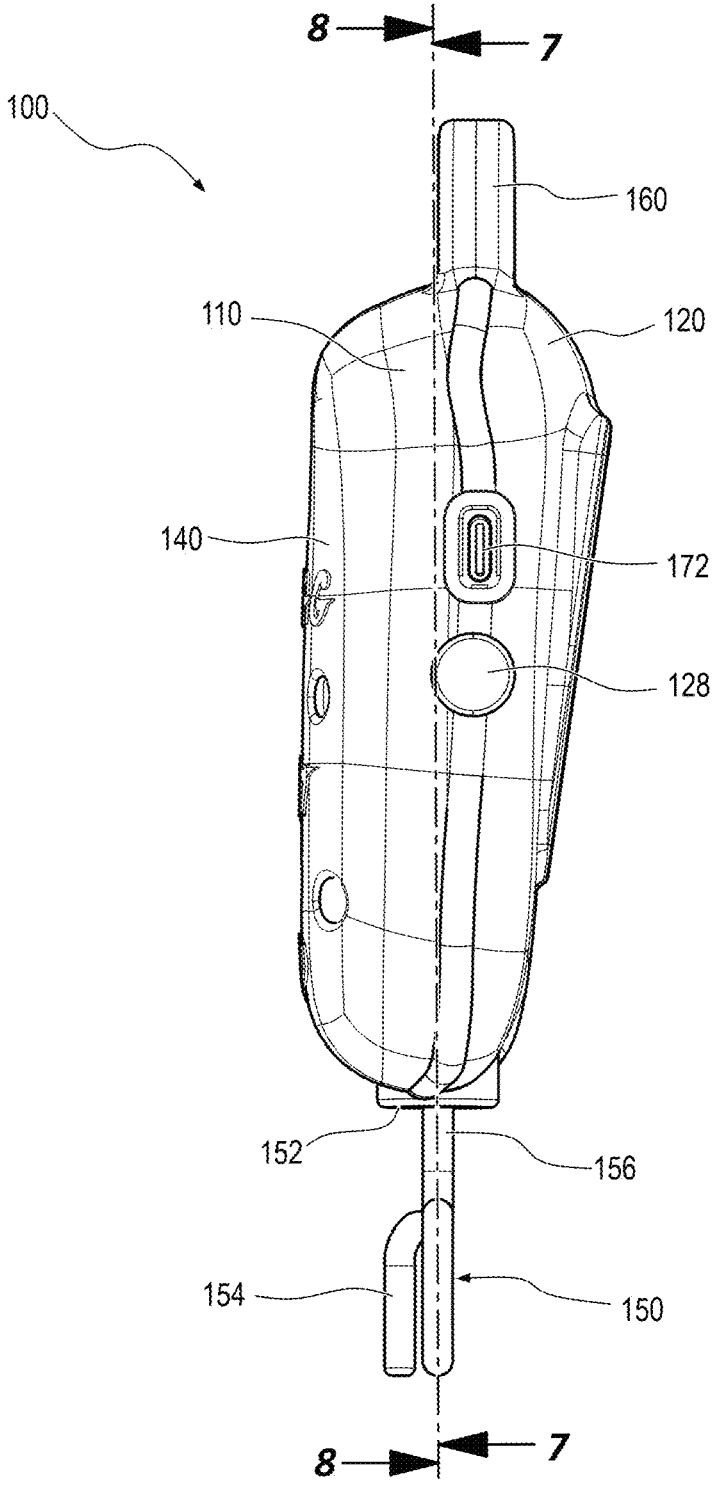
FIG. 6 illustrates a left elevation view of the embodiment of the fishing reel drag set apparatus, system, and method 100 of FIG. 1.
Figure 7:
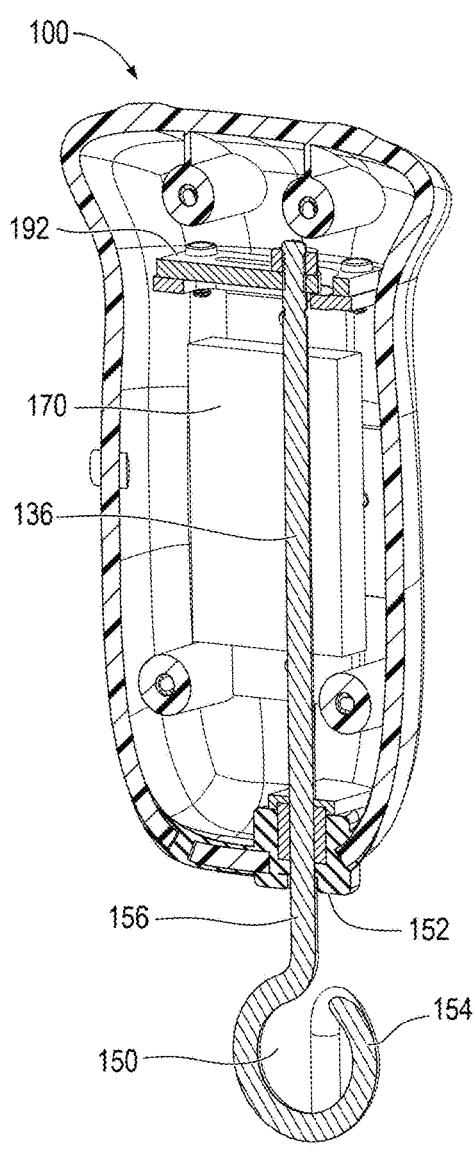
FIG. 7 illustrates a cross-sectional top right perspective view of the embodiment of the fishing reel drag set apparatus, system, and method 100 of FIG. 6 taken at "7-7".
Figure 8:
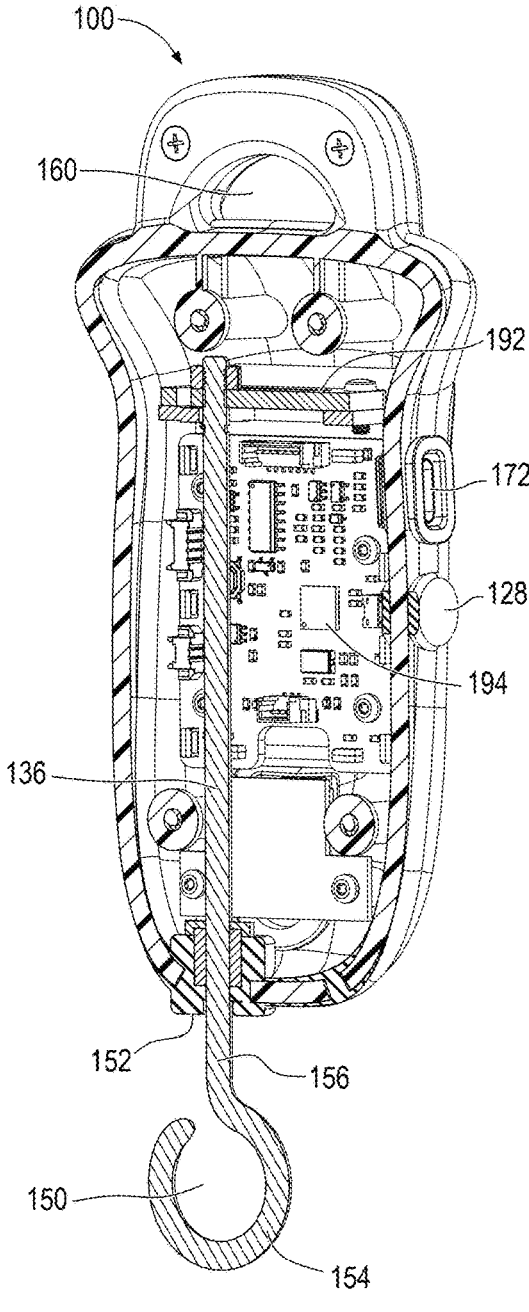
FIG. 8 illustrates a cross-sectional top left perspective view of the embodiment of the fishing reel drag set apparatus, system, and method 100 of FIG. 6 taken at "8-8".
Figures 9A, 9B, 9C:
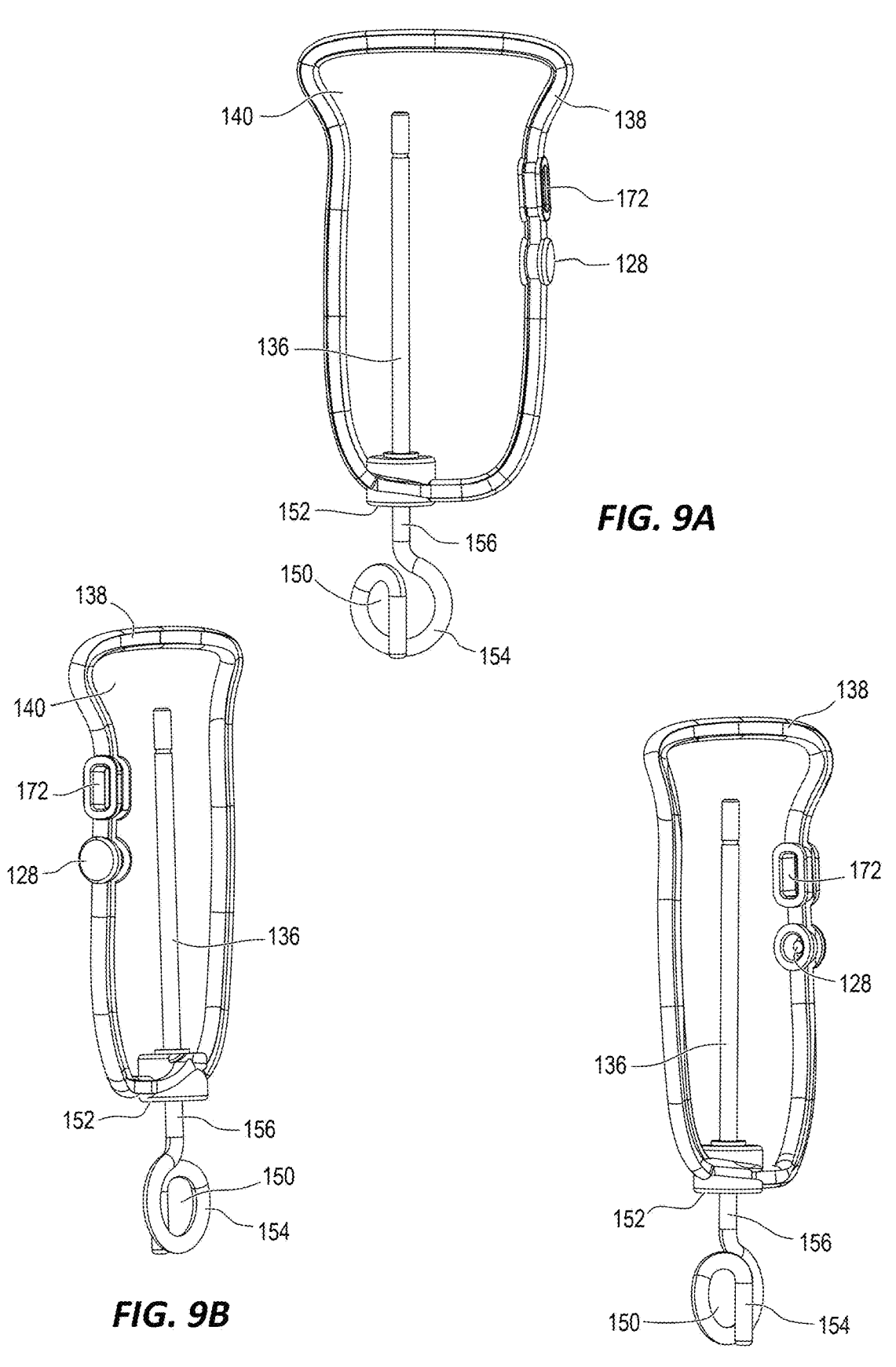
FIG. 9A illustrates a perspective rear view of the lower housing 140, depicting the first eyelet 150, reduced neck 152, hook 154, shaft 156, and integrated rod 136 for the embodiment of the fishing reel drag set apparatus, system, and method 100 of FIG. 1.
FIG. 9B illustrates a perspective left front side view of FIG. 9A.
FIG. 9C illustrates a perspective right rear side view of FIG. 9A.
Figures 10A, 10B, 10C:
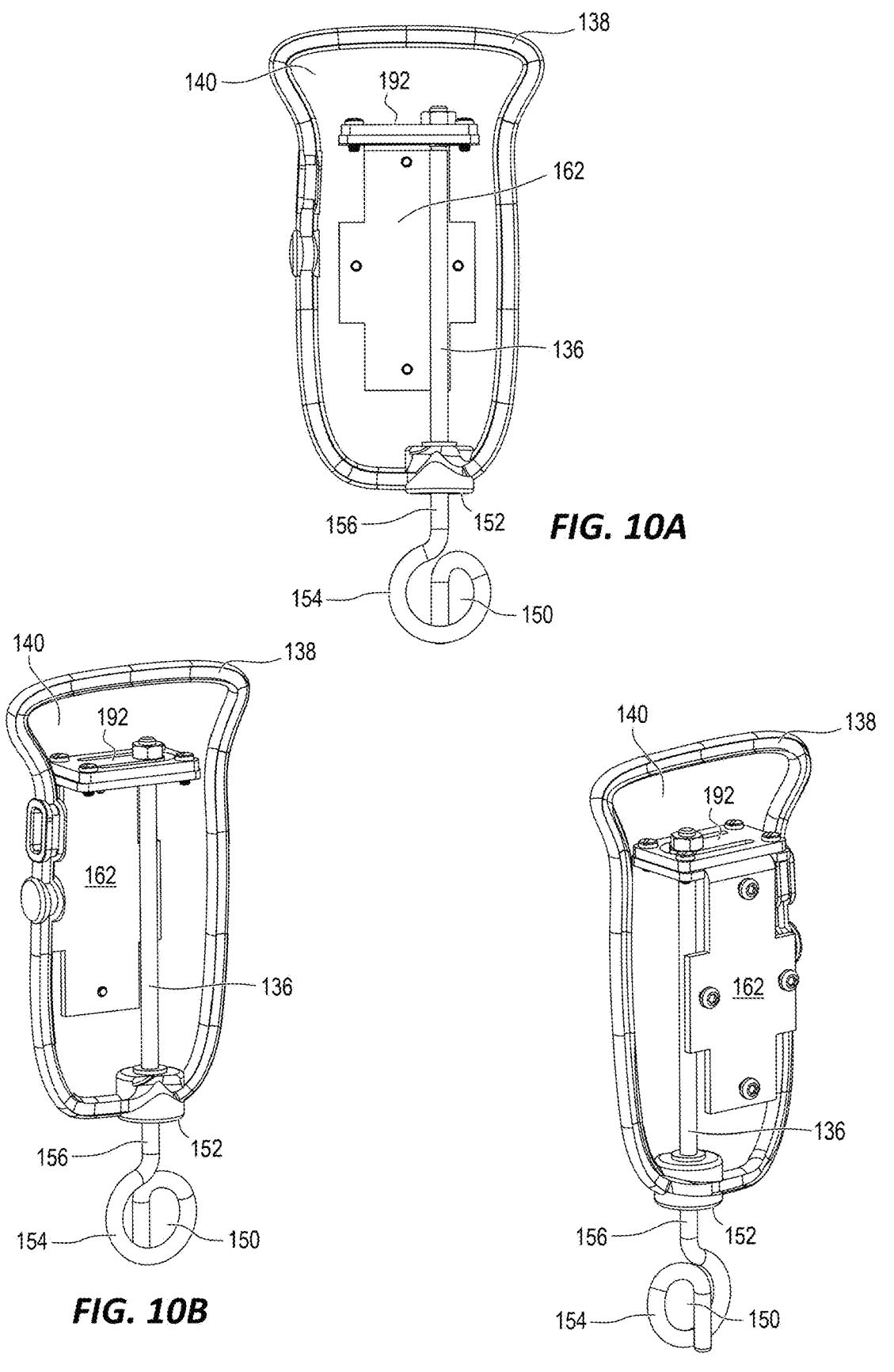
FIG. 10A illustrates a perspective front view of the lower housing 140 of FIG. 9A further including mounting frame 162, strain gauge bridge 164, and mechanical block 192.
FIG. 10B illustrates a perspective left front side view of FIG. 10A.
FIG. 10C illustrates a perspective left rear side view of FIG. 10A.

The innovation is now described with reference to drawing FIGS. 1-17, wherein reference numerals are used to refer to like elements throughout. In the following description, for explanation, many specific details are set forth to provide a thorough understanding thereof. It may be clear, however, that the innovation can be practiced without these specific details. In other instances, well-known structures and devices are shown in block diagram form to help with a description thereof. Various embodiments are discussed. The figures are described only to help with the description of the embodiments. They are not intended as an exhaustive description of the invention and do not limit the scope of the invention. Also, an illustrated embodiment need not have all the parts or advantages shown. Thus, in other embodiments, the features described from different embodiments may be combined.

Certain terms are used throughout the following description and claims to refer to features or components for the fishing reel drag set apparatus, system, and method 100. As one skilled in the art will appreciate, different people may refer to the same feature or part by different names. This document does not intend to distinguish between components or features that differ in name but not structure or function. As used herein "fishing reel drag set apparatus, system, and method," "fishing real drag set apparatus and system," "fishing reel drag set device," "apparatus," "system," "method", and "device" are interchangeable and refer to the fishing reel drag set apparatus, system, and method 100 of the present invention.

The present invention, in one exemplary embodiment, consists of a fishing reel drag set apparatus, system, and method 100 that allows users to set a desired amount of tension in fishing lines and alerts users when that tension is reached, or is below or above the desired amount of tension. The device primarily consists of a body 110, an external function button 128, an external select button 132, an upper housing 120, a liquid crystal display (LCD) touchscreen 130, a plurality of light emitting diode (LED) lights 126, a microprocessor 188 providing non-volatile and volatile memory and a microprocessor control board 194 housed within the body 110, a lower housing 140, two eyelets 150 and 160, and a rechargeable, internal Lithium battery 170, FIGS. 1-5, and 12. In differing embodiments, the body 110 may appear to be a key fob with eyelets on each end, FIG. 6. The body 110 may also be made of a plurality of flexible or semi-flexible plastic material and is waterproof. To protect the internal components, the housing 110 is waterproof and waterproofing measures may include one or more of the following: an O-ring type gasket 138, FIGS. 14B, 14C, and 14D, made from silicon or suitable sealant, or any other suitable waterproofing measures as are known in the art. In addition, any surface of the body may consist of a plurality of indicia 144, such as patterns, logos, emblems, images, symbols, designs, letters, words, characters, animals, advertisements, brands and trademarks, FIGS. 2, 4 and 14, that might be fish or angler related. Some embodiments of fishing reel assembly, system, and method may include an upper housing 120 and a lower housing 140, each made of the same translucent material, which protects the electrical elements inside. The upper housing 120 and lower housing 140 may be fixedly attached to one another by threaded fasters 260, FIGS. 5, 14C-14E, or removable and snap together, if the overall housing structure, the body 110, protects the components inside. The upper housing 120 comprises a plurality of buttons 128 and 132, a plurality of LED lights 126, and an LCD touchscreen 130, FIGS. 1-3, and 12. Each end of the body 110 includes an eyelet 150 and 160, each providing an eyelet opening, FIG. 13A. The first eyelet 150 includes a hook 154 and shaft 156, FIGS. 10A-10B. The hook 154 includes an integrated rod 136 that is movable within the body 110 in the axial direction of the shaft 156 through the continuous opening 152 which stabilizes the hook 154. The internal rod top end 136 is attached to the internal strain gauge 182, FIGS. 11A and 11B, and an external fishing line 310, FIG. 16, may be attached to the external hook 154, FIG. 16. An internal mechanical block 192 is integrated with the strain gauge 182 to prevent overextension, protecting both the strain gauge 182 and the body 110 from damage due to excessive force on the hook 154, FIGS. FIGS. 11A-11G. The second eyelet 160, attached to the opposite side of the device, is used for attachment to a fob connector 312, vest, backpack or other convenient carrying device, which in turn can be secured by a support element 314, FIG. 16 to set the desired drag for the fishing line, FIG. 17.

Figure 12:
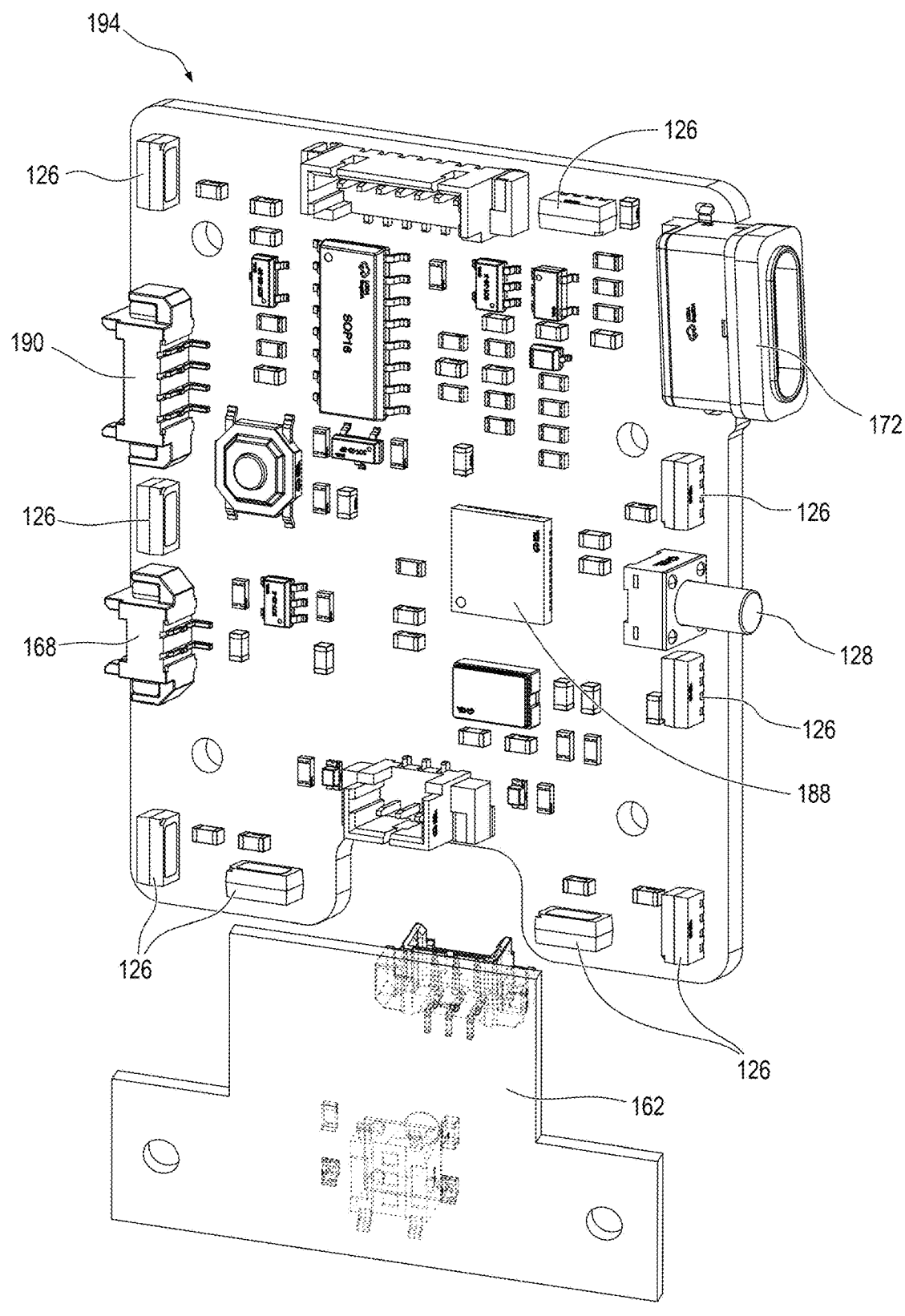
FIG. 12 illustrates a perspective view of the surface mounted processor control board 194.

Embodiments of the fishing reel assembly, system, and method provide a plurality LED lights 126, FIG. 12, wherein the plurality of LED lights 126 send a visual signal by illuminating the translucent body 110 to the user. During operation, the device assembly and system provide real-time visual feedback via color-coded indicators. A yellow color coded strain LED light 126 output indicates the drag set is below the target threshold. A green color coded strain LED light 126 output indicates the drag is set within the acceptable target—the drag set goal has been met. A red color coded strain LED light 126 output indicates the drag exceeds the upper 25% limit of the fishing line class rating, FIGS. 15A-15D, and 17. These color signals to the user of drag set as opposed to the target range or threshold may combine as translucent body 110 colors supported by readout text generated on the LCD touchscreen 130.

For embodiments of the fishing reel assembly, system, and method, the LCD touchscreen 130 displays the tension setting that is inputted into the system by a user, via pressing the operational button 128 and displays the real-time output of the tension in the fishing line 310 while in use, FIGS. 15A-15D, and 17. The orientation of the LCD touchscreen display may be selectively reversed 180 degrees by the user depending on the orientation of the body 110 to the user's line of sight during the drag set test.

Figures 11A, 11B, 11C, 11D, 11E, 11F, 11G:
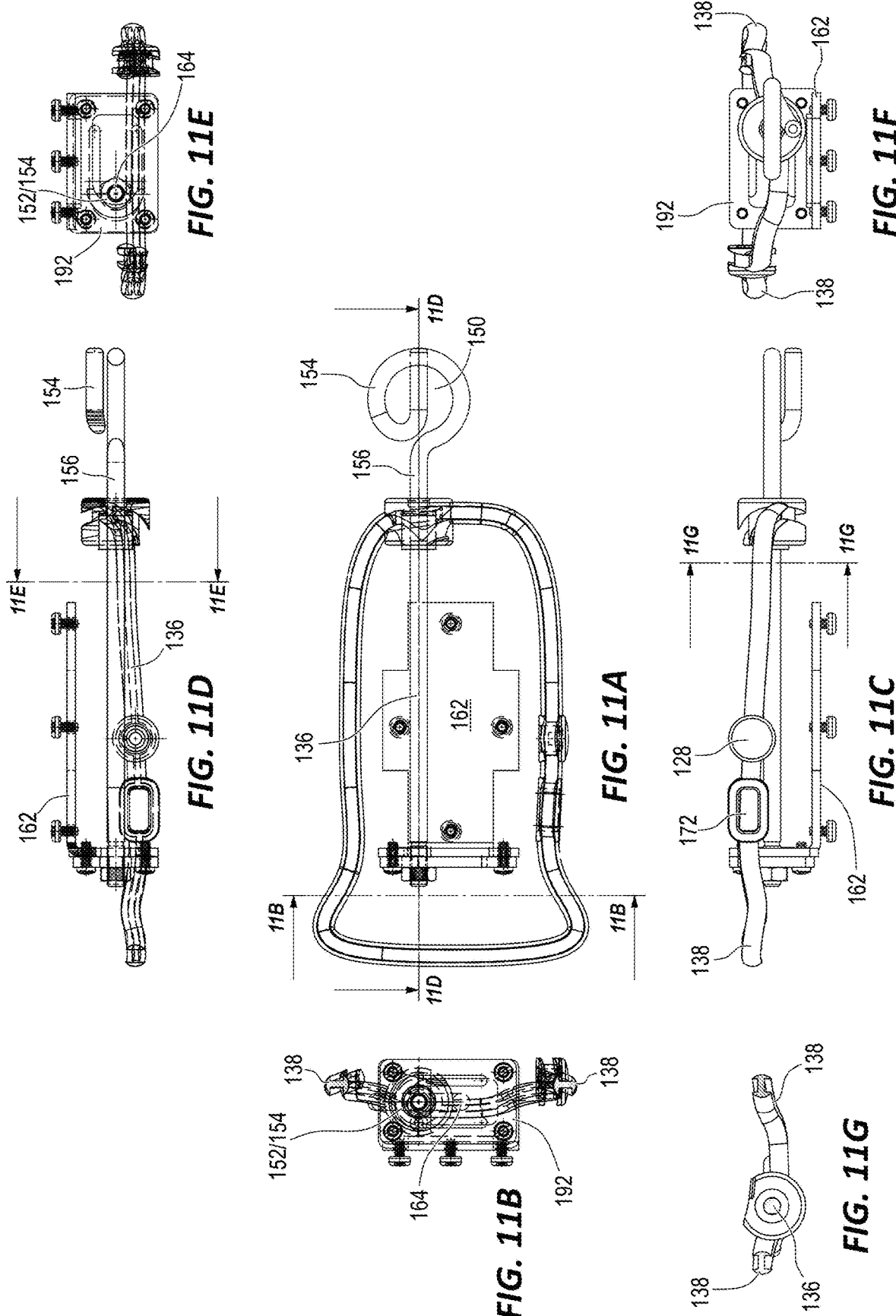
FIG. 11A illustrates a rear elevation view of the lower housing of FIG. 10A.
FIG. 11B illustrates a cross-sectional view of FIG. 10A taken at "B-B."
FIG. 11C illustrates a cross-sectional view of FIG. 10A taken at "C-C."
FIG. 11D illustrates a cross-sectional view of FIG. 10A taken at "D-D."
FIG. 11E illustrates a cross-sectional view of FIG. 11D taken at "E-E."
FIG. 11F illustrates a bottom planar view of FIG. 11C.
FIG. 11G illustrates a cross-sectional view of FIG. 11C taken at "G-G."
Figure 16:
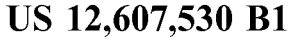
FIG. 16 illustrates a top left front perspective view of the embodiment of the fishing reel drag set apparatus, system, and method 100 of FIG. 1 with the fishing line 310 end from a fishing rod and reel attached to the hook 154 first eyelet 150 and a fob connector 312 supporting the fishing reel drag set apparatus, system, and method 100 by attachment of a second eyelet 160 to a support element 314.

Other components inside or on the body 110 include an internal microprocessor control element 188 providing non-volatile and volatile memory and a microprocessor control board 194, FIG. 12, a plurality of external control buttons 128 and 132, FIGS. 1-5, an internal fitted and attached (LCD) touchscreen 130 having the touchscreen element on a top surface of the upper housing 120, FIGS. 1-5, a strain gauge 182 with Wheatstone bridge circuitry 184, FIGS. 11B and 11E, used to measure the tension in the fishing line 310, FIG. 16, a first eyelet 150, a second eyelet 160, an internal, rechargeable battery 170, and a charging port 172. The internal, rechargeable battery 170 powers the microprocessor control element 188, the LCD touchscreen 130, the LED control driver 127, the plurality of LEDs 126, the operational button 128, the select button 132, and any other system part requiring electrical power. When the device is not in use, a silicon plug (not shown) sized to be received into the charging port 172 is fitted into the charging port 172 to maintain the waterproof environment of the internal body 110.

Referring to the drawings, FIGS. 1-5, illustrate perspective views of an embodiment of the fishing reel drag set device 100 of the present invention that is adjustable. The device 100 primarily consists of a body 110, an upper housing 120, a liquid crystal display (LCD) screen 130, a lower housing 140, a first eyelet 150, a second eyelet 160 and an internal battery 170. Embodiments of the device 100 depict the body 110 shaped as generally rectangular with curved or rounded edges, FIGS. 13A-13F, suitable to be hand-held. However, in differing embodiments, the body 110 may have a plurality of shapes and sizes that include at least one or more rectangular, circular, square, triangular, or other suitable geometric shape or size as known in the art.

The mechanical design of embodiments of the fishing reel assembly, system, and method 100 may incorporate a combination of rigid and flexible materials to ensure durability, accuracy, and ease of use. Notable design aspects include a precision-mounted sensor housing wherein the strain gauge 182 is securely enclosed to reduce external interference while allowing its controlled movement for accurate system readings FIGS. 11A-11G. The enclosure design includes vibration-dampening features to prevent measurement distortions from external forces, and an internal mounting frame 162 securing internal components of the assembly including the microprocessor control board 194, rechargeable Lithium battery 170, the strain gauge bridge 164, and the mechanical block 192 by threaded fasteners 260 and 270 affixed to the lower housing 140, FIGS. 5, 8, 11B, 13C, and 13D. The fishing reel assembly, system, and method 100 includes modular construction and integral components for scalability. Various embodiments of the fishing reel assembly, system, and method are designed for ease of assembly and mass production, with modular components that can be adjusted for different applications. The fishing reel assembly, system, and method architecture allow for user and system customization in force measurement ranges, sensor sensitivities, and display output.

Further, the body 110 of selected embodiments of the fishing reel assembly, system, and method 100 may be made of a plurality of materials such as wood or metal, but is preferably made of a flexible or semi-flexible plastic, such as but not limited to: acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, or any other suitable material as known in the art. In addition, the body 110 is typically waterproof and may be transparent, translucent, semi-transparent, or opaque in differing embodiments. The bottom surface 144 of the body 110, FIGS. 14C-14D, may be adorned by indicia as patterns, logos, emblems, images, symbols, designs, letters, words, characters, animals, advertisements, trademarks, brands, etc., or any other suitable indicia 146 as known in the art, that might be fish or fishing-related, FIGS. 2 and 4.

Figures 14A, 14B, 14C, 14D, 14E, 14F, 14G:
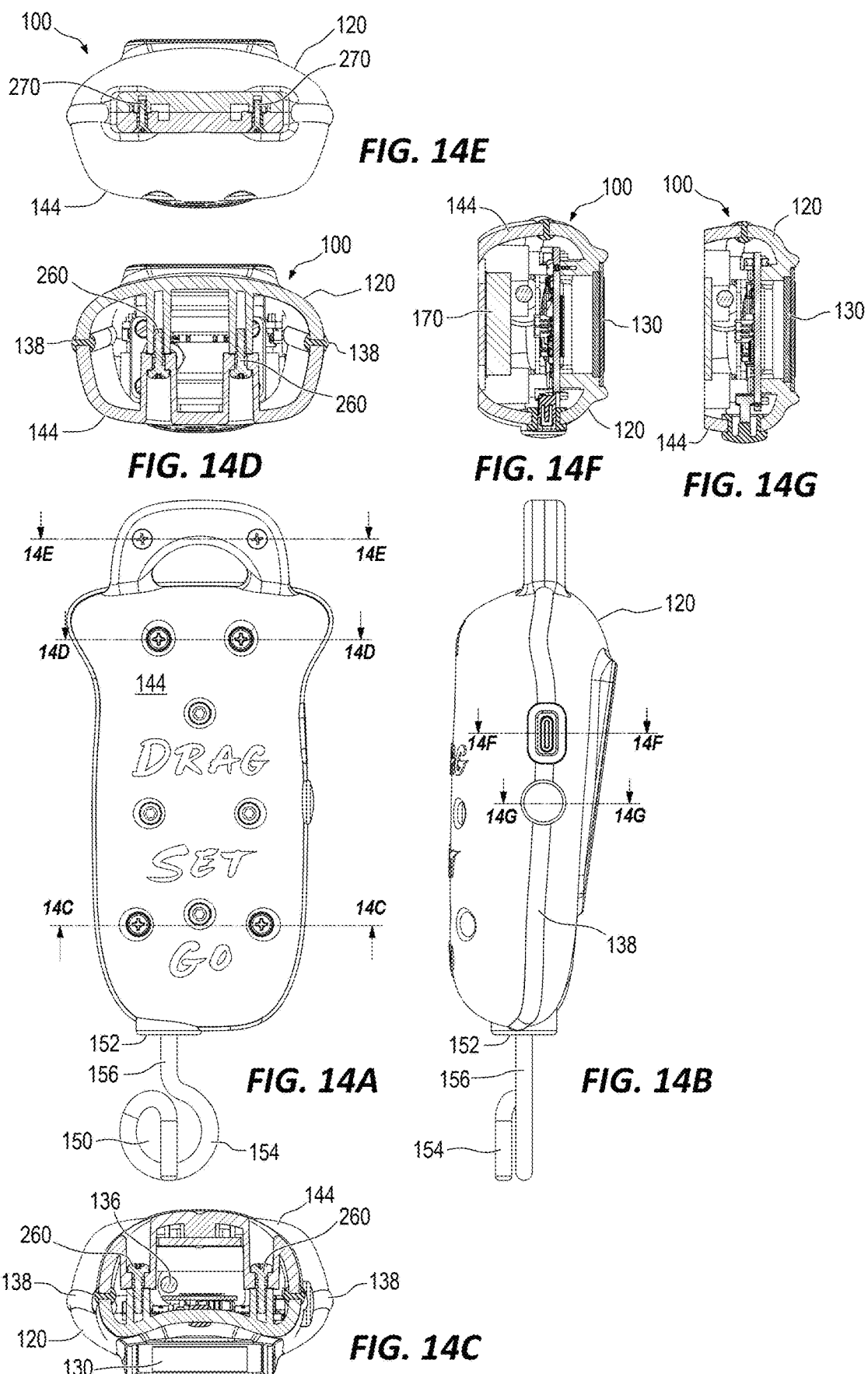
FIG. 14A illustrates a rear elevational view of the fishing reel drag set apparatus, system, and method 100 of FIG. 1.
FIG. 14B illustrates a left side view of the fishing reel drag set apparatus, system, and method 100 of FIG. 14A.
FIG. 14C illustrates a cross-sectional view of FIG. 14A taken at "C-C."
FIG. 14D illustrates a cross-sectional view of FIG. 14A taken at "D-D."
FIG. 14E illustrates a cross-sectional view of FIG. 14A taken at "E-E."
FIG. 14F illustrates a cross-sectional view of FIG. 14B taken at "E-E."
FIG. 14G illustrates a cross-sectional view of FIG. 14B taken at "G-G."
Figure 15A:
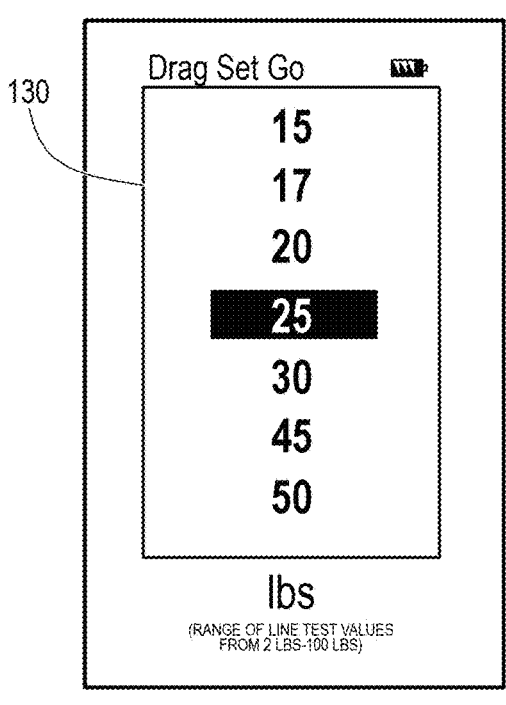
FIG. 15A illustrates a representative interactive LCD touchscreen 130 display providing the main menu for a range of fishing line test values ranging from 2 to 100 pounds and the active battery charge for an embodiment of the fishing reel drag set apparatus, system, and method 100.
Figure 15B:
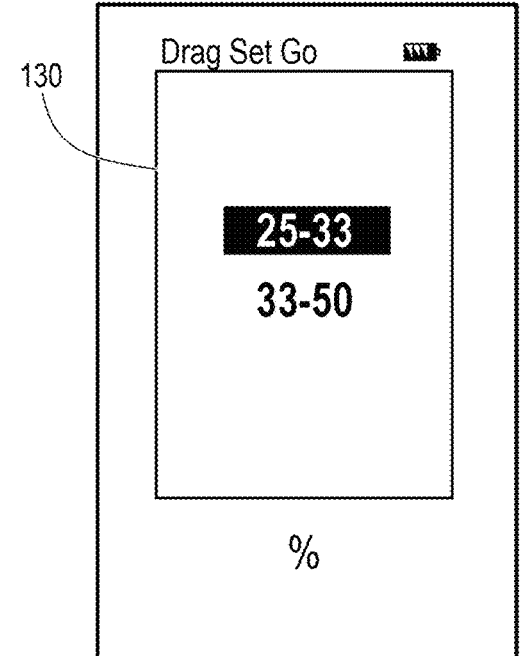
FIG. 15B illustrates a representative interactive LCD touchscreen 130 display providing the percentage drag ranges and the active battery charge for an embodiment of the fishing reel drag set apparatus, system, and method 100.
Figure 15C:
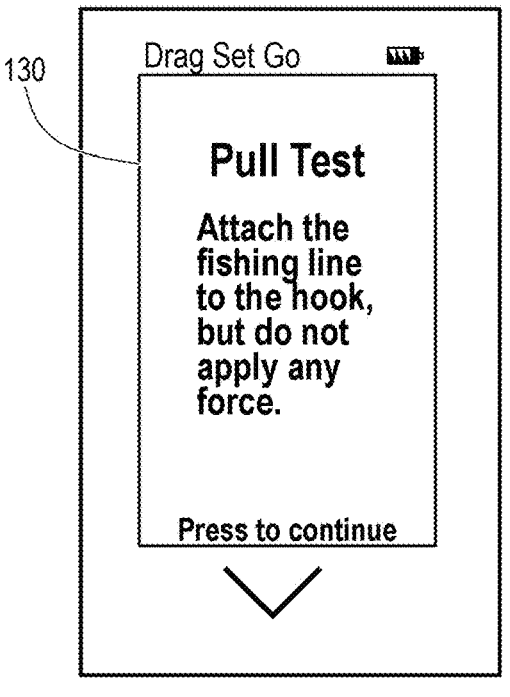
FIG. 15C illustrates a representative interactive LCD touchscreen 130 display providing an instruction for the user to attach the fishing line end from a fishing rod and reel for which an optimal drag is desired to the hook and the active battery charge for an embodiment of the fishing reel drag set apparatus, system, and method 100.
Figure 15D:
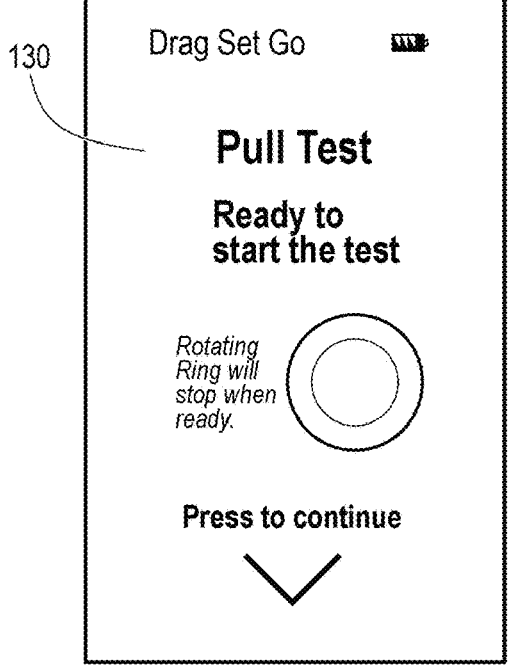
FIG. 15D illustrates a representative interactive LCD touchscreen 130 display providing an instruction for the user to begin the pull test on the fishing line attached to the hook and to observe when the desired drag has been set, and the active battery charge for an embodiment of the fishing reel drag set apparatus, system, and method 100.

As shown in FIGS. 1-5, the second eyelet 160 is attached to the second end of body 114 with fasteners 270 between corresponding portions of the upper housing 120 and the lower housing 140, FIGS. 14A and 14E, presenting a continuous opening 162. The second end 114 of the body 110 and its attachments are designed to attach to a plurality of items such as, but not limited to, a fob key chain connector 312, a fishing vest, a tackle box, a backpack, or other fishing-related items, or any other suitable item as known in the art. The upper housing 120 and lower housing 140 are fixedly attached to one another or removably attached. The upper housing 120 and lower housing 140 protect the interior elements of the device 100, however elements such as LED lights 126, select button 132, and an LCD touchscreen 130 are accessible for user input and may be on the top surface of the upper housing 120, FIGS. 1 and 3. Further, to protect the internal components, the housing 110 is waterproof and waterproofing measures can comprise one or more of the following: an O-ring/gasket 138, FIGS. 10A-

10C. a sealant, a film, caulking, or any other suitable waterproofing measures known in the art.

Embodiments of the fishing reel drag set apparatus, system, and method 100 feature strain gauge 182 equipped with a Wheatstone bridge circuit 184. When mechanical force (strain) is applied to an integrated rod 136, the strain gauge 182 detects the movement and generates a corresponding voltage signal, FIGS. 11A-11E. This signal is fed into a microprocessor 188 that includes an analog-to-digital converter (ADC) 190, FIG. 12, which converts the analog voltage signal into a calibrated digital value representing force—displayed in either kilograms or pounds—on the LCD touchscreen 130.

Embodiments of the fishing reel assembly, system, and method 100 may provide capability for users to weigh caught fish by detaching the caught fish from the fishing hook and line and hooking the caught fish through the gills with the hook 154. A separate weighing mode is entered from the user mode choices once the system is powered on. By holding the fishing reel drag set apparatus and system 100 up with the suspended fish on the hook, the weight of the caught fish displayed on the LCD touchscreen 130 in either pounds or kilograms depending on the user selected preference. The user can selectively memorialize the fish and fish weight by separate recording means such as manual written entry into a logbook or photography by separate digital camera taking a photo of the LCD touchscreen 130.

Figure 17:
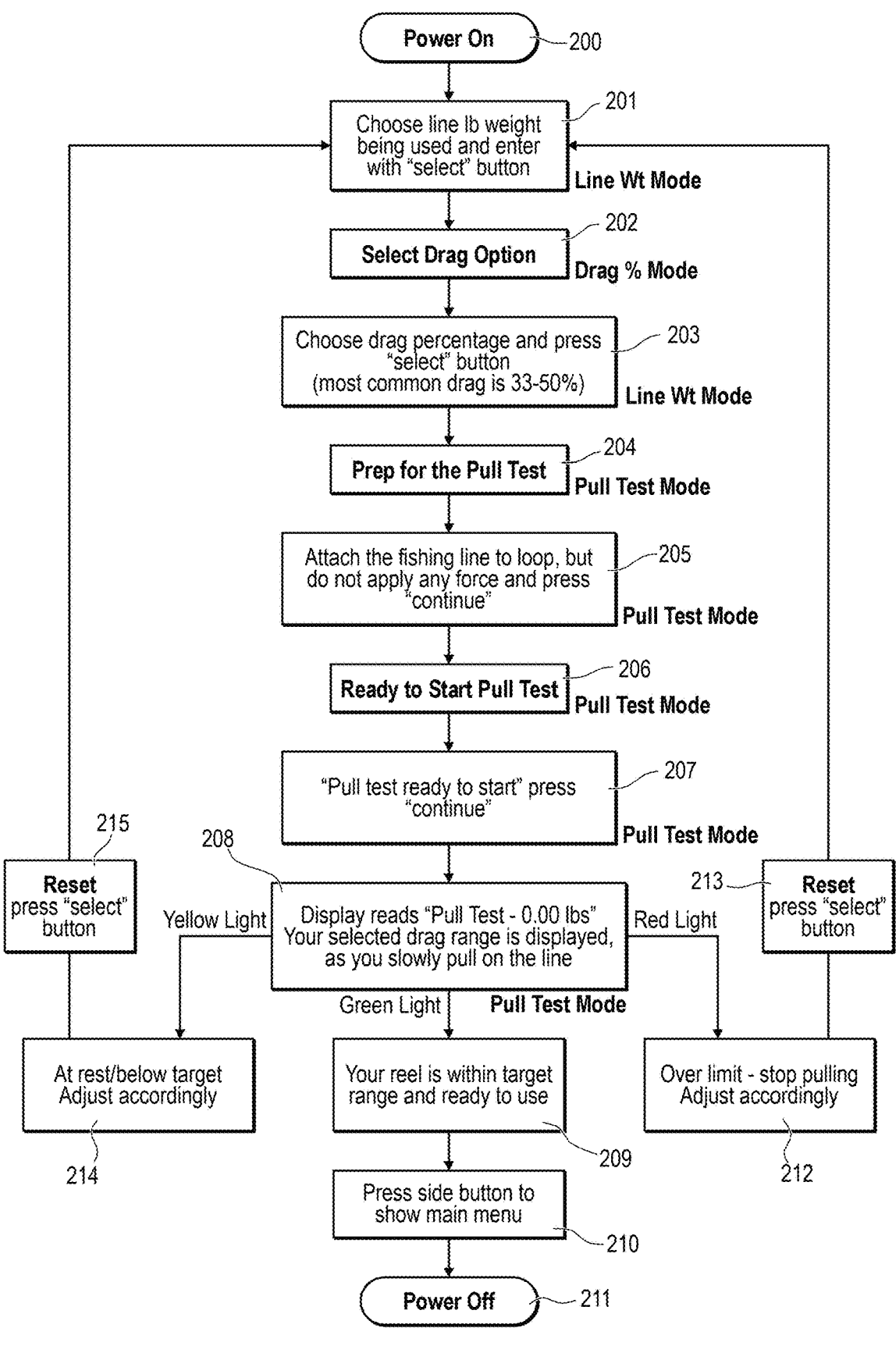
FIG. 17 is a representative logic flow diagram providing the method steps for the operational function of setting the fishing line drag for the fishing reel drag set apparatus, system, and method 100.

A plurality of light emitting diode (LED) lights 126 illuminate in at least three differing yet distinct colors to visually alert the user of different tension present on the fishing line 310, FIGS. 12, 16 and 17. The select button 132 (operational option on LCD screen 130) assists the user to adjust the tension setting of the device 100. The LCD touchscreen 130 then displays the set (or programmed) tension setting and the current tension of the fishing line 310 in real-time. In a preferred embodiment, when 25% of the fishing line 310 class rating has been reached, the LEDs 126 illuminate the translucent body 110 as green. When between 25% and 33% of the fishing line 310 class rating has been reached, the LEDs 126 illuminate the translucent body 110 as yellow. When the fishing line 310 class rating exceeds 33%, the LEDs 126 illuminate the translucent body 110 as red.

FIGS. 13A-13D illustrates multiple views of a first eyelet 150 and a hook 154 of the fishing reel drag set device of the present invention. Attached to the first end of the body 112 is the first eyelet 150 which has a continuous opening 152, a hook 154 and a shaft 156. The hook 154 is metal, preferably stainless steel, and are designed to allow the fishing line 310 to be attached to/tied around an external end of the hook 154, FIG. 16. The internal end of the hook 154 is attached to a strain gauge 182, FIGS. 11A-11G, that measures the tension in the fishing line 310 (once the fishing line 10 has been secured to the hook 154) and is movable in an axial direction of the shaft 156, FIGS. 16 and 17.

Figures 13A, 13B, 13C, 13D, 13E, 13F:
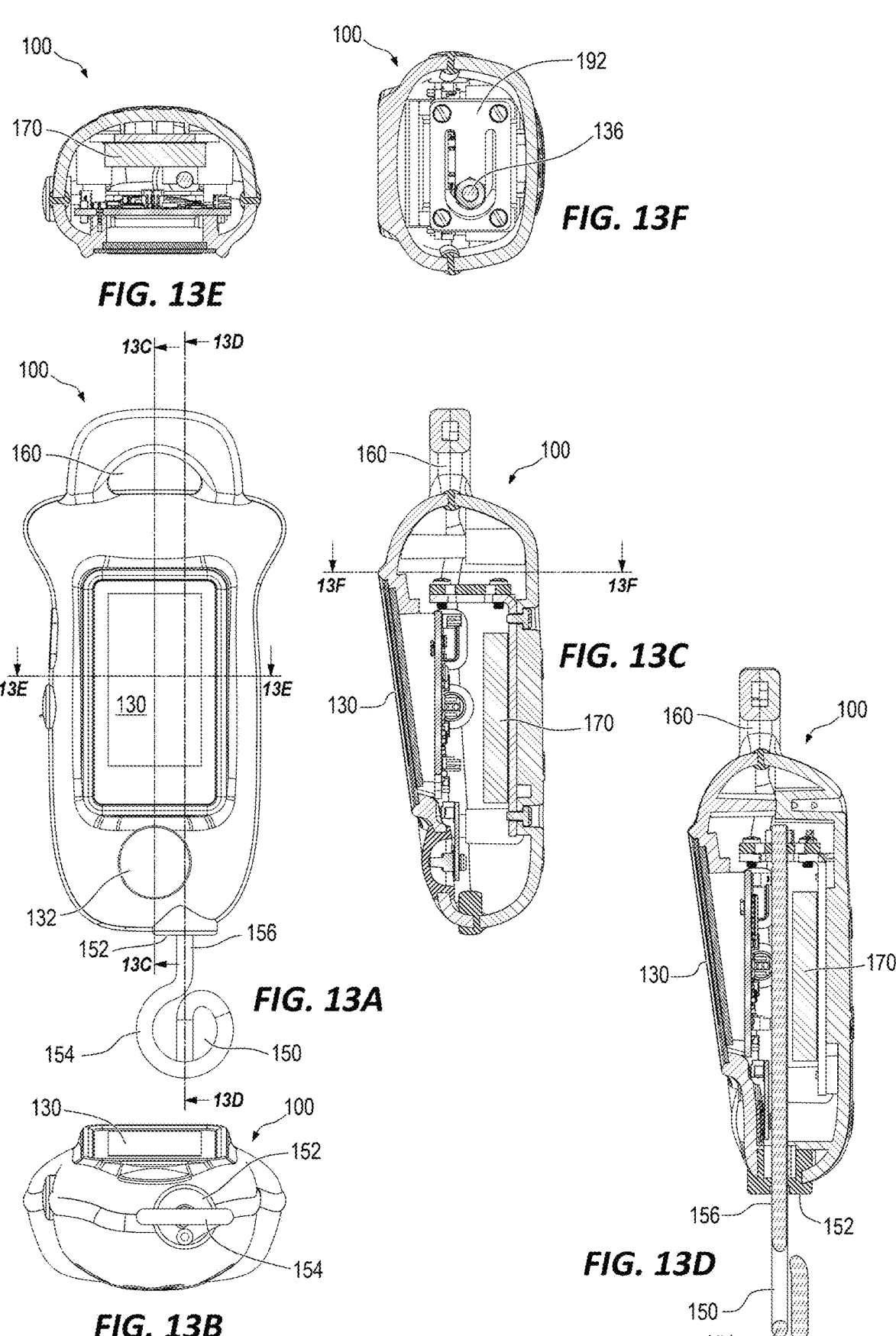
FIG. 13A illustrates a front elevational view of the fishing reel drag set apparatus, system, and method 100 of FIG. 1.
FIG. 13B illustrates a planar bottom view of FIG. 13A.
FIG. 13C illustrates a cross-sectional view of FIG. 13A taken at "C-C."
FIG. 13D illustrates a cross-sectional view of FIG. 13A taken at "D-D."
FIG. 13E illustrates a cross-sectional view of FIG. 13A taken at "E-E."
FIG. 13F illustrates a cross-sectional view of FIG. 13C taken at "F-F."

The internal battery 170, FIGS. 13C, 13D, and 14F, may be a rechargeable Lithium battery 170, or an alkaline, nickel-cadmium, nickel-metal hydride battery 170, or any 3-12 volt DC battery 170 or other conventional battery 170 such as A, AA, AAA, or any other suitable battery as known in the art that can supply power to the device. Throughout this specification the terms "battery" and "batteries" may be used interchangeably to refer to one or more wet or dry cells or batteries 170 of cells in which chemical energy is converted into electricity and used as a source of DC power. References to recharging or replacing batteries 170 may refer to recharging or replacing individual cells, individual batteries 170 of cells or a package of multiple battery cells, as is appropriate for any battery 170 technology that may be used. The battery 170 is rechargeable through the charging port 172, FIGS. 2-4, 12, and 14B, which is a charging port 172 present on a side surface of the body 110, FIGS. 2 and 4. In differing embodiments, the charging port 172 may be a USB port-type, including without limitation, USB-A, USB-B, Micro-B, Micro-USB, Mini-USB, USB-C, or any other suitable charging port device as known in the art. The processor control board 194 includes power management, charge management, and power protection circuitry and, among other aspects, turns the system off after a set period of no user response.

Embodiments of the fishing reel drag set apparatus, system, and method feature an intuitive menu-driven interface controlled via a select button 132 for a user choosing an operational option displayed on LCD touchscreen 130. The user can select from multiple settings, including orientation of display options, metric or English units of measurement, apparatus/system calibration, LCD brightness, LED brightness, test mode, strain percentage target, and fish weighing mode, FIGS. 1-5, 15A-15D, and 17. Upon selecting a setting, the menu-driven interface on LCD touchscreen 130 presents the corresponding options or logical next step in a system-controlled sequence. The user selects or confirms the selection via the select button 132, which engages the selected function or advances the apparatus/system/method stage or step of operation, FIG. 17.

An exemplary method of use for the fishing reel drag set apparatus, system, and method 100, FIG. 17, includes these steps:

A. providing a fishing reel drag set apparatus as disclosed;

B. turning on the fishing reel drag set apparatus and system by depressing the side button (on/off) 128 (200);

C. choosing the fishing line weight being tested by entering the select button 132 or tapping the LCD touchscreen (201);

D. scrolling the choice of options displayed on the LCD touchscreen 130 for the number of line drag options displayed by pressing a finger on the touchscreen to highlight your desired line drag option (202);

E. depressing the select button 132 or tapping the LCD touchscreen to enter the selected line drag option (203);

F. preparing for the pull test mode (204);

G. following the instructions displayed on the LCD touchscreen 130 for attaching the fishing line to the hook 154 (205);

H. scrolling the choice of options select button 132 to advance to the "Pull Test" step (206);

I. depressing the select button 132 or tapping the LCD touchscreen to enter the pull test option (207);

J. reading the pull test force displayed on the LCD touchscreen 130 while slowly pulling the fishing line using the fishing reel 208;

K. finishing the test mode when you are within your target range and the translucent body 110 is green (209)—go to step N;

L. adjusting the force as necessary when you are below your target range and the translucent body 110 is yellow (214) or when you are over your target range and the translucent body 110 is red (212);

M. pressing select button to reset (215) or (213) and go to step C;

N. returning to the main menu for the fishing reel drag set apparatus and system by depressing the side button (on/off) 128 (210);

O. selecting power down mode to turn off fishing reel drag set apparatus and system (211).

The system for fishing reel drag set 100 provides: a) precise strain measurement tuned for fishing drag calibration, b) dynamic, automated microprocessor-controlled logic loop managing system input-output interactions, c) intuitive menu interface and color-coded output display to guide users in correctly setting their fishing reel drag, d) safety and mechanical protections to ensure fishing reel drag set durability and reliability in field use.

Embodiments of the hand-held, highly sophisticated electronic system 100 to enable fishermen to accurately set the drag tension on their fishing reels to match the test strength of the fishing line and the species they are targeting may include a strain-sensing system integrated with microprocessor 188 providing non-volatile and volatile memory and a microprocessor control board 194 for and controlled Input/Output (I/O) architecture, FIGS. 1-5, and 12. The system 100 includes a strain gauge 182 with a Wheatstone bridge circuit 184 contacting an end of the integrated rod 136, FIGS. 11A-11G. When the angler applies tension to the fishing line via a pull on the fishing rod/reel being set attached the hook 154 end of the integrated rod 136, the strain gauge 182 contacting the integrated rod 136 end opposite the hook 154 measures the resulting mechanical force, FIGS. 15A-17. The strain gauge 182 and Wheatstone bridge circuit 184 converts this mechanical force into an analog voltage proportional to the applied strain. The analog voltage signal is continuously fed into the microprocessor's 188 analog-to-digital converter (ADC) 190, FIG. 12. The ADC converter 190 digitizes the strain signal and the microprocessor 188 applies calibration factors to convert the raw digital data into a calibrated force value represented in either kilograms or pounds, depending on the user's selected unit preference.

The disclosed system for fishing reel drag set provides a menu-driven user interface accessible via an LCD touchscreen 130 and physical buttons 128 and 132 for power on/off and user selection confirmation, respectively, FIGS. 1-5, 15a-15D, and 17. User menu options include power on/off, calibration, LCD brightness, LED brightness, drag test mode, fish weighing mode, and target strain percentage (linked to test line strength and species). After the user selects a menu item, the microprocessor 188 presents a corresponding option screen via the LCD touchscreen 130 output. Once the user interacts with the LCD touchscreen and/or select button 132, the microprocessor registers the user's selections and stores them in working memory. The microprocessor 188 then advances the system state when the physical button is pressed, confirming each selection, FIGS. 12, 15A-15D, and 17.

During a drag set test cycle (pulling on the fishing line) for an embodiment of the disclosed system for fishing reel drag set, FIG. 16, the microprocessor 188 continuously monitors the incoming strain signal and compares the measured value against the target strain window, calculated from user-selected line test and species parameters. The microprocessor 188 dynamically updates the visual digital feedback on the LCD touchscreen 130 and the translucent body 110 color via the following color-coded logic: a) yellow—strain below target window, b) green—strain within target window (Drag set correctly), or c) red -p- strain exceeds target window (Drag over tensioned). The user can then adjust the tested reel's drag system accordingly, FIGS. 12, 15A-15D, and 17.

The disclosed system 100 for fishing reel drag set provides electronics are implemented on a compact surface-mounted processor control board 194, FIG. 12, integrating the following functional system blocks: a) microprocessor 188 manages all input/output (I/O), signal processing, logic flow, and user interface operations, b) strain gauge and Wheatstone bridge circuitry 184 by ADC 190 input to microprocessor 188, c) LCD touchscreen controller to provide real-time display of system status and feedback, d) LED control driver to support LCD touchscreen 130 and backlight/indicator control, e) user input block to support user LCD touchscreen 130 input and dedicated select button for menu navigation, and f) power management of the Integrated Lithium battery 170 power system, including charge management and protection circuitry.

The disclosed system 100 for fishing reel drag set provides a mechanical block 192 integrated into the strain gauge 182 assembly to prevent overextension and mechanical damage. If excessive force is applied, this mechanical block 192 physically limits strain gage 182 travel before strain exceeds safe thresholds. FIGS. 11A-11G.

Embodiments of the fishing reel drag set apparatus, system, and method 100 may provide an artificial intelligence (AI) machine learning model which can be implemented by the microprocessor control element 188 providing non-volatile and volatile memory and a microprocessor control board 194 to realize one or more of these advantages. By training the same machine learning model on multiple selectable fishing reel drag set system tasks through input on the LCD touchscreen 130, as described in this specification, once the model has been trained, the model can be used for each of the multiple selectable system tasks with an acceptable level of performance. The microprocessor 188 providing non-volatile and volatile memory and microprocessor control board 194 systems that need to achieve acceptable performance on multiple tasks can do so while using less of their storage capacity and having reduced system complexity. For example, by maintaining a single instance of a model rather than multiple different instances of a model each having different parameter values, only one set of parameters needs to be stored rather than multiple different parameter sets, reducing both the amount of storage space required and electrical power consumed from the integrated Lithium battery 170 while maintaining acceptable level of performance on each system task, and helping to predict mechanical failure. By training the model on a new selectable system task by adjusting values of parameters of the model to optimize an objective function that depends in part on how important the parameters are to previously learned task(s), the model can effectively learn new tasks in succession and protect learned knowledge about previous tasks.

Despite the foregoing, the fishing reel drag set device 100 of the present invention and its various components can be of any suitable size and configuration as known in the art without affecting the overall idea of the invention, if they meet the above-stated goals. One of ordinary skill in the art will appreciate that the size, configuration and material of the fishing reel drag set device 100 as shown in FIGS. 1-17 is for illustrative purposes only, and that many other sizes and shapes of the fishing reel drag set device 100 are well within the scope of the present disclosure. Although the dimensions of the fishing reel drag set device 100 are important design parameters for user convenience, the fishing reel drag set device 100 may be of any size, shape and/or configuration that ensures ideal performance during use and/or that suits the user's needs and/or preferences.

The improved fishing reel drag set device of the present invention is advantageous as it improves the efficiency of known fishing practices. Further, the device can universally attach to any fishing rod, reel, and fishing line in a way that does not damage the rod or reel or interfere with the fishing rod's or fishing reel's intended design and use. Also, the device controls the amount of tension in a fishing line with either a static amount of tension or a variable amount of tension. So, the device eliminates the need for a user to guess how much tension should be applied to the fishing line while fishing.

Various changes can be made to the exemplary embodiments discussed without departing from the scope of the present invention. While the embodiments described above refer to features, the scope of this invention also includes embodiments having different combinations of features and embodiments that do not include all the described features. The scope of the present invention is intended to embrace all such alternatives, changes, and variations as fall within the scope of the claims, together with all equivalents thereof.

This disclosure includes examples of the claimed subject matter. It is impossible to describe every conceivable combination of components or methodologies to describe the claimed subject matter, but one of ordinary skill in the art may recognize that many further combinations and permutations of the claimed subject matter are possible. The claimed subject matter is intended to embrace all such alterations, changes and variations that fall within the spirit and scope of the appended claims. To the extent that the term "includes" is used in either the detailed description or the claims, this term is intended to be inclusive in a way like the term "comprising" as "comprising" is interpreted when employed as a transitional word in a claim.

The invention claimed is:

1. A fishing reel drag set apparatus that allows a user to set a fishing line to a desired amount of tension and that alerts the user when the desired amount of tension is reached or exceeded, the fishing reel drag set apparatus comprising: a body comprising an upper housing removably secured to a lower housing; an external function button, an external select button, an LCD touchscreen fixedly attached to the upper housing wherein the LCD touchscreen is positioned on an outward surface of the upper housing; a strain gauge equipped with a Wheatstone bridge circuit within the body; a mechanical block integrated into the strain gauge; a microprocessor control board and a microprocessor comprising non-volatile and volatile memory within the body; a plurality of LED lights within the body; a first eyelet having a first continuous opening, wherein the first eyelet is secured to a first side of the body and comprises an external hook and a shaft secured to an integrated rod contacting the strain gauge within the body; a second eyelet having a second continuous opening, wherein the second eyelet is secured to a second side of the body, opposite of the first eyelet; and a rechargeable battery within the body;

wherein the strain gauge detects a strain on the integrated rod when mechanical force from the fishing line is applied to the hook, and the Wheatstone bridge generates a corresponding voltage signal;

wherein the generated voltage signal is fed into the microprocessor control board which converts it into a calibrated digital value representing real time visual feedback of fishing line force displayed in units by the microprocessor via the LCD touchscreen and/or plurality of LED lights.

2. The fishing reel drag set apparatus of claim 1, wherein the microprocessor and microprocessor board comprise a menu-driven system interface controlled by the LCD touchscreen allowing a user to select from multiple settings comprising: power on or off; fishing line test mode, fishing weight mode, force calibration; LED brightness; orientation of LCD touchscreen text; and strain percentage target.

3. The fishing reel drag set apparatus of claim 2, wherein: a) the real-time visual feedback of fishing line force through the plurality of LED lights further comprises a yellow color code indicating the fishing line strain is below a lower end of a target range, a green color code indicating the fishing line strain is within the target range and drag set has been achieved, and a red color code indicating the fishing line strain exceeds an upper end of the target range; and b) the real-time visual feedback of fishing line force to the user through color-coded LED lights is observable through a translucent body and/or from a digital display reading on the LCD touchscreen.

4. The fishing reel drag set apparatus of claim 3, wherein the mechanical block is integrated into the strain gauge to prevent overextension, protecting both the strain gauge and the apparatus from excessive force.

5. The fishing reel drag set apparatus of claim 4, wherein a) the microprocessor control board integrates the microprocessor, a strain gauge signal processing circuitry, a power management system, and a user interface controller, and b) the rechargeable battery comprises a rechargeable lithium battery providing extended operational life across multiple charge cycles.

6. The fishing reel drag set apparatus of claim 5, wherein selecting the fishing weight mode provides a user the option of hooking a caught fish by the gills on the external hook to obtain the weight of the fish displayed as either kilograms or pounds on the LCD touchscreen.

7. The fishing reel drag set apparatus of claim 6, further comprising a microprocessor comprising non-volatile and volatile memory and microprocessor control board implemented machine learning model, wherein the machine learning model has at least a plurality of parameters and has been trained on a first machine learning task using first training data to determine first values of the plurality of parameters of the machine learning model, and wherein the method comprises: a) determining, for each of the plurality of parameters, a respective measure of an importance of the parameter to the first machine learning task, comprising: computing, based on the first values of the plurality of parameters determined by training the machine learning model on the first machine learning task, an approximation of a posterior distribution over possible values of the plurality of parameters, assigning, using the approximation, a value to each of the plurality of parameters, the value being the respective measure of the importance of the parameter to the first machine learning task and approximating a probability that the first value of the parameter after the training on the first machine learning task is a correct value of the parameter given the first training data used to train the machine learning model on the first machine learning task; b) obtaining second training data for training the machine learning model on a second, different machine learning task; and training the machine learning model on the second machine learning task by training the machine learning model on the second training data to adjust the first values of the plurality of parameters to optimize performance of the machine learning model on the second machine learning task while protecting performance of the machine learning model on the first machine learning task;

wherein adjusting the first values of the plurality of parameters comprises adjusting the first values of the plurality of parameters to optimize an objective function that depends in part on a penalty term based on the determined measures of importance of the plurality of parameters to the first machine learning task, and wherein the objective function comprises reducing the amount of storage space required by the non-volatile and volatile memory, reducing electrical power consumed from the integrated Lithium battery, maintaining acceptable level of performance on each system task, and helping to predict system mechanical failure.

8. A method for using apparatus or to set fishing reel drag, the method comprising the steps:

A. providing a fishing reel drag set apparatus according to claim 7;

B. turning on the fishing reel drag set apparatus and system by depressing the function button;

C. choosing the fishing line weight being tested by entering the select button or tapping the LCD touchscreen;

D. scrolling the choice of options displayed on the LCD touchscreen for line drag options displayed by pressing a finger on the touchscreen to highlight a desired line drag option;

E. depressing the select button or tapping the LCD touchscreen to enter the selected line drag option;

F. preparing for a pull test mode;

G. following an instruction displayed on the LCD touchscreen for attaching the fishing line to the hook;

H. scrolling the choice of options to advance to a "Pull Test" step;

I. depressing the select button or tapping the LCD touchscreen to enter a pull test option;

J. reading a pull test force displayed on the LCD touchscreen while slowly pulling the fishing line using the fishing reel;

K. finishing the test mode when you are within your target range and the translucent body is green—go to step N;

L. adjusting the force as necessary when you are below your target range and the translucent body is yellow or when you are over your target range and the translucent body is red;

M. pressing select button to reset and go to step C;

N. returning to the main menu for the fishing reel drag set apparatus and system by depressing a side button;

O. selecting the power down mode on the LCD touchscreen to turn off the fishing reel drag set apparatus and system.

9. A fishing reel drag set system comprising: a) precise strain measurement tuned for fishing line drag calibration, b) a dynamic, automated microprocessor-controlled logic loop managing system input-output interactions, c) an intuitive menu interface and color-coded output display to guide users in correctly setting their fishing reel drag, and d) safety and mechanical protections to ensure fishing reel drag set durability and reliability in field use, the safety and mechanical protections at least comprising a mechanical block integrated into a strain gauge and Wheatstone bridge assembly.

10. The fishing reel drag set system of claim 9, further comprising a hand-held, highly sophisticated electronic system to enable fishermen to accurately set the drag tension on their fishing reels to match the test strength of the fishing line and the species they are targeting, the hand-held, highly sophisticated electronic system comprising: a) a strain-sensing system integrated with a microprocessor comprising non-volatile and volatile memory and a microprocessor control board for and controlled Input/Output (I/O) architecture; b) the strain gauge and Wheatstone bridge assembly comprising a circuit contacting an end of an integrated rod to i) measure mechanical force applied to the integrated rod by a fishing line attached to an external hook of the integrated rod, ii) convert the mechanical force into an analog voltage proportional to the applied strain, and iii) continuously feed a voltage into the microprocessor control board's analog-to-digital converter;

wherein the microprocessor comprising non-volatile and volatile memory applies calibration factors to convert the raw digital data into a calibrated force value represented in either kilograms or pounds, depending on the user's selected unit preference.

11. The fishing reel drag set system of claim 10, wherein a) the intuitive menu interface is accessible via an LCD touchscreen and physical buttons, b) user menu options include power on/off, calibration, LCD brightness, LED brightness, drag test mode, fish weighing mode, LCD display orientation, and target strain percentage linked to test line strength and fish species, c) after the user selects a menu item, the microprocessor comprising non-volatile and volatile memory presents a corresponding option screen via the LCD touchscreen output, and d) after user interacts with the LCD touchscreen and/or physical button as to the option, the microprocessor comprising non-volatile and volatile memory registers the user's selection, stores it in working memory, and then advances the system state confirming each user selection.

12. The fishing reel drag set system of claim 11, wherein during a drag set test cycle the microprocessor comprising non-volatile and volatile memory a) continuously monitors the incoming strain signal and compares the measured value against the target strain window, calculated from user-selected line test and species parameters, b) dynamically updates the visual digital feedback on the LCD touchscreen and the translucent body color via the following color-coded LED logic: i) yellow—strain below target window, ii) green—strain within target window (Drag set correctly), or iii) red—strain exceeds target window, and the user can then adjust the tested reel's drag system accordingly.

13. The fishing reel drag set system of claim 12, wherein the surface-mounted processor control board integrates the following functional system blocks: a) microprocessor input/output (I/O), signal processing, logic flow, and user interface operations, b) strain gauge and Wheatstone bridge circuitry by ADC input to microprocessor, c) LCD touchscreen controller, d) LED control driver to support LCD touchscreen and LED backlight/indicator control, e) LCD touchscreen input and select button for menu navigation, and f) power management of the integrated Lithium battery power system, including charge management and protection circuitry.

14. The fishing reel drag set system of claim 13, wherein the mechanical block integrated into the strain gauge and Wheatstone bridge assembly physically limits strain gage travel before force on the strain gauge exceeds safe thresholds.

\* \* \* \* \*